US008780285B1

(12) United States Patent
Stuppi et al.

(10) Patent No.: US 8,780,285 B1
(45) Date of Patent: Jul. 15, 2014

(54) APPARATUS FOR VIEWING 3D LCD DISPLAYS

(75) Inventors: Albert N. Stuppi, Springville, IA (US); Bruce D. Hufnagel, Marion, IA (US); Craig E. Harwood, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 93 days.

(21) Appl. No.: 12/566,918

(22) Filed: Sep. 25, 2009

(51) Int. Cl.
| G02F 1/1335 | (2006.01) |
| G02F 1/1347 | (2006.01) |
| G02F 1/13 | (2006.01) |
| G09G 5/00 | (2006.01) |
| G03B 21/00 | (2006.01) |
| G02B 27/22 | (2006.01) |
| G02B 27/26 | (2006.01) |

(52) U.S. Cl.
USPC ............... 349/13; 349/15; 349/74; 349/117; 349/194; 345/6; 353/7; 353/8; 359/464; 359/465

(58) Field of Classification Search
USPC ............... 349/13, 15, 74–78, 117–119, 194; 345/6; 353/7, 8, 20; 359/454, 465
See application file for complete search history.

(56) References Cited

U.S. PATENT DOCUMENTS

| 5,113,285 | A | * | 5/1992 | Franklin et al. ............... 359/465 |
| 6,002,518 | A | * | 12/1999 | Faris ............................. 359/465 |
| 6,181,303 | B1 | | 1/2001 | Johnson et al. |
| 7,106,509 | B2 | * | 9/2006 | Sharp ....................... 359/488.01 |
| 7,517,081 | B2 | * | 4/2009 | Lipton et al. ..................... 351/49 |
| 2004/0120039 | A1 | * | 6/2004 | Sato et al. ..................... 359/465 |
| 2005/0168696 | A1 | * | 8/2005 | Flynn et al. ..................... 353/20 |
| 2006/0285026 | A1 | * | 12/2006 | Robinson ......................... 349/15 |
| 2006/0291053 | A1 | * | 12/2006 | Robinson et al. ............. 359/465 |
| 2007/0132953 | A1 | * | 6/2007 | Silverstein ....................... 353/7 |
| 2008/0129899 | A1 | * | 6/2008 | Sharp .............................. 349/13 |
| 2009/0066863 | A1 | * | 3/2009 | Chen ............................... 349/13 |

OTHER PUBLICATIONS

T.A. Sergan, et al., Polymer Negative Birefringence Films for Compensation of Twisted Nematic Devices, Aug. 22, 2009, Displays, pp. 259-267, Publisher: Elsevier, Published in: US.

* cited by examiner

*Primary Examiner* — Lucy Chen
*Assistant Examiner* — Paisley L Arendt
(74) *Attorney, Agent, or Firm* — Donna P. Suchy; Daniel M. Barbieri

(57) ABSTRACT

An apparatus for viewing stereoscopic images may include, but is not limited to: a first viewing lens including a first polarization layer; a second viewing lens including a second polarization layer; and one or more birefringence compensation layers. Further, the apparatus may be viewing glasses including a frame wearable by a user.

11 Claims, 3 Drawing Sheets

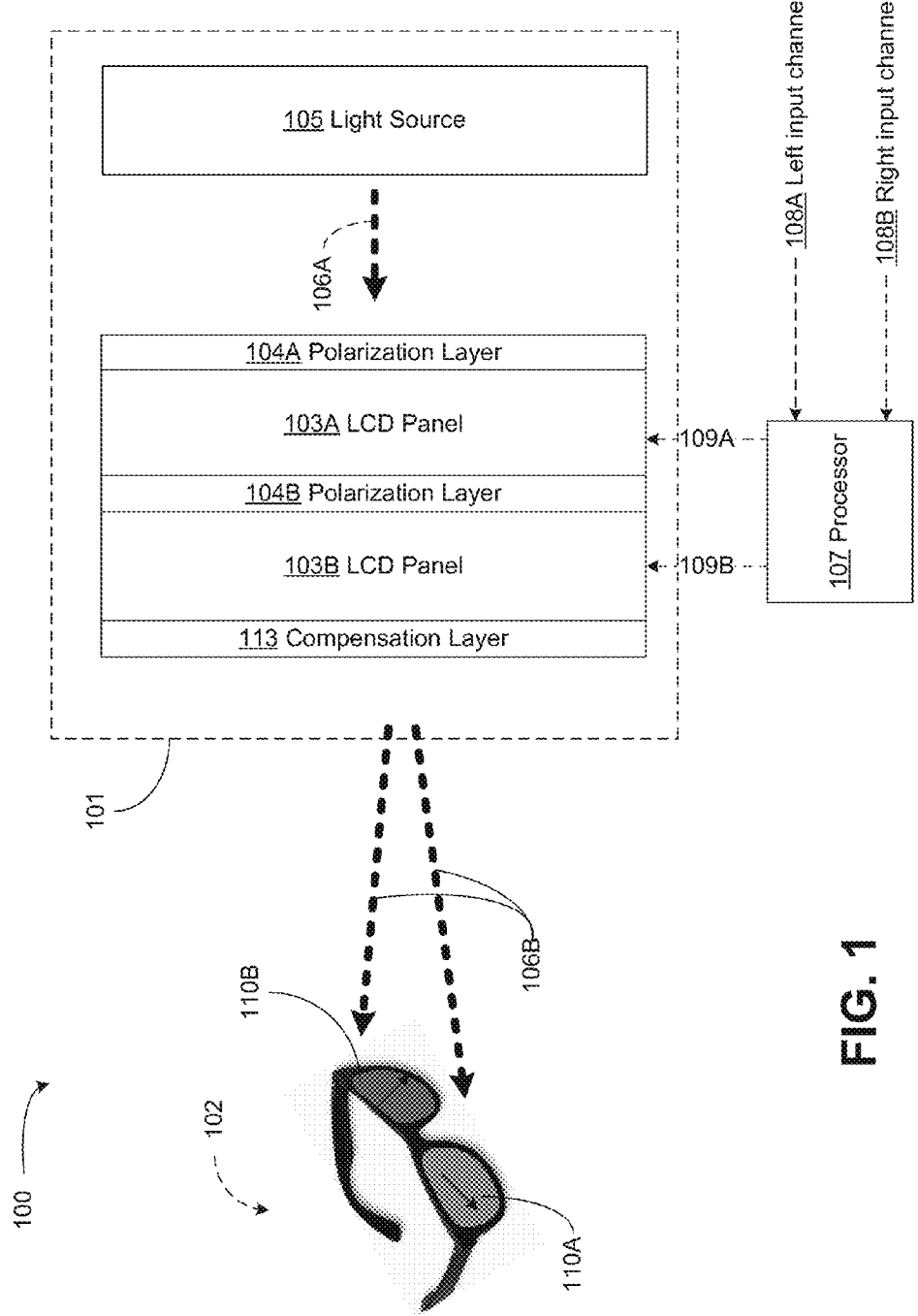

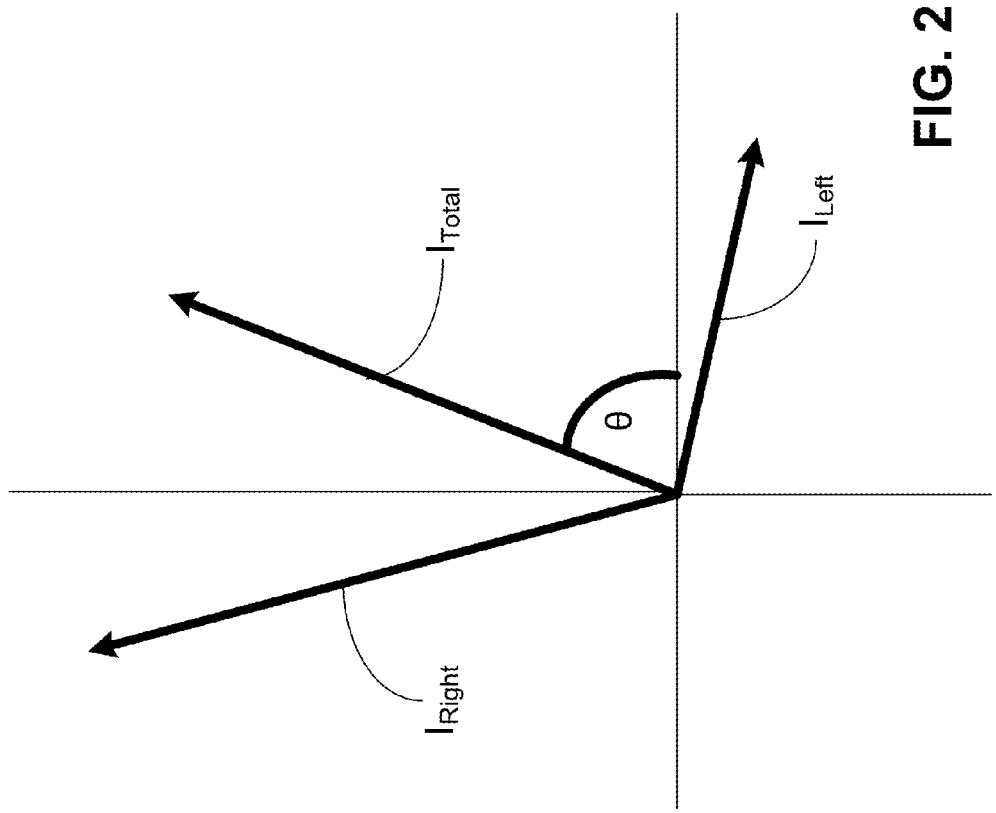

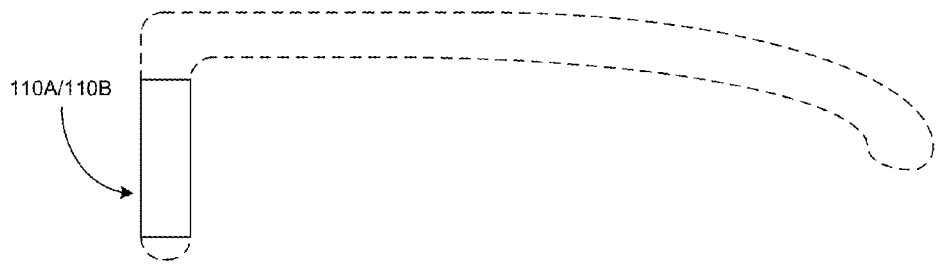
FIG. 3A
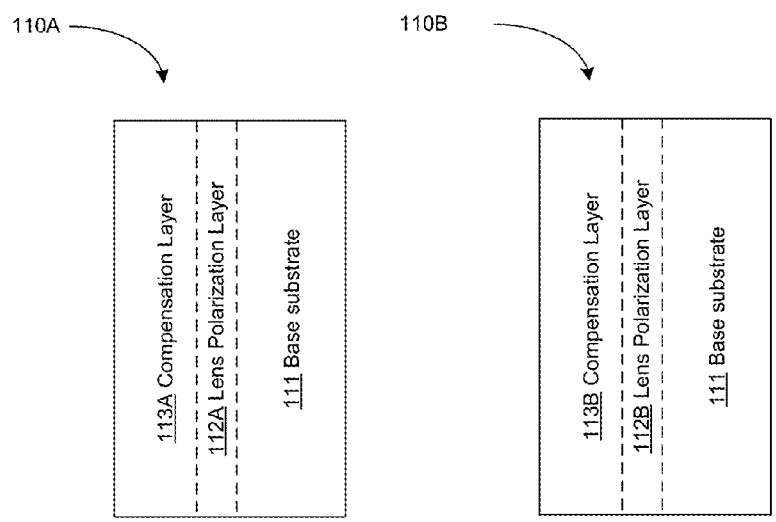
FIG. 3B  FIG. 3C

APPARATUS FOR VIEWING 3D LCD DISPLAYS

SUMMARY

An apparatus for viewing stereoscopic images may comprise: a first viewing lens including a first polarization layer; a second viewing lens including a second polarization layer; and one or more bifringence compensation layers.

BRIEF DESCRIPTION OF THE DRAWINGS

The disclosure will become more fully understood from the following detailed description, taken in conjunction with the accompanying drawings, wherein like reference numerals refer to like elements, in which:

FIG. 1 illustrates a system for displaying and viewing stereoscopic images.

FIG. 2 illustrates vector representation of stereoscopic image intensities.

FIGS. 3A-3C illustrate an apparatus for viewing stereoscopic images.

DETAILED DESCRIPTION

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention may be not limited to the particular embodiments depicted in the exemplary diagrams, but should be construed in accordance with the language in the claims.

Referring to FIG. 1, a three-dimensional (3D) display 100 is depicted. The 3D display system 100 may include a flat-panel display 101 which may be configured to display 3D images in the form of a stereo image pair including polarization-encoded left and right images. The 3D display system 100 may further include a pair of polarized glasses 102 which may be worn by a user.

The flat-panel display 101 may include a pair of stacked liquid crystal display panels (LCD) 101 (e.g. LCD 103A and LCD 103B). The LCD 103A may be a standard twisted-nematic liquid crystal panel array including polarization layer 104A and polarization layer 104B of the type commonly found in laptop computers and LCD televisions. The flat-panel display 101 may further include a light source 105 for illuminating the LCD 103A and LCD 103B. The polarization layer 104B may be orthogonally polarized with respect to polarization layer 104A. For example, the polarization layer 104A may impart a vertical polarization to an input beam of light 106A while the polarization layer 104B may impart a horizontal polarization to the input beam of light 106A. Similarly, the LCD 103B may also be a standard liquid crystal panel but may not include any polarization layers.

The flat-panel display 101 may further include a processor 107. The processor 107 may receive input channel 108A including image data associated with a left-channel of a stereoscopic image pair and an input channel 108B including image data associated with a right-channel of a stereoscopic image pair. The intensities of the input channel 108A and the input channel 108B may be processed so as to generate a control signal 109A which may be provided to LCD 103A and a control signal 109B which may be provided to LCD 103A.

The control signal 109A may cause one or more pixels of LCD 103A to rotate a input beam of light 106A that has been vertically polarized by polarization layer 104A by an amount such that, when the input beam of light 106A subsequently passes through polarization layer 104B and is horizontally polarized thereby, the beam intensity is the composite sum of the intensities of the input channel 108A and the input channel 108B as shown in given in Equation (1) and illustrated in FIG. 2:

$$I_{total} = I_{Left} + I_{Right} \quad (1)$$

where $I_{Left}$ is the vector quantity associated with the intensity of the input channel 108A for a given pixel and $I_{Right}$ is the vector quantity associated with the intensity of the input channel 108B for the given pixel.

The control signal 109B may cause one or more pixels of LCD 103B to rotate a input beam of light 106A that has been horizontally polarized by polarization layer 104B by an amount such that when the input beam of light 106A subsequently passes through polarization layer 104B and is horizontally polarized thereby, is rotated by the angle θ, as given in Equation (2) and illustrated in FIG. 2:

$$\cos^2\theta = I_{Left}/I_{total} \quad (2)$$

where $I_{Left}$ is the vector quantity associated with the intensity of the input channel 108A for a given pixel and $I_{total}$ total is the vector quantity associated with the composite sum of the intensities of the input channel 108A and an input channel 108A for a given pixel as calculated via Equation (1).

Referring to FIGS. 1 and 3A-3C, polarized glasses 102 are depicted. The polarized glasses 102 may include a viewing lens 110A and a viewing lens 110B. The viewing lens 110A may include a base substrate 111 (e.g. a glass substrate) and a lens polarization layer 112A. The viewing lens 110B may include a base substrate 111 (e.g. a glass substrate) and a lens polarization layer 112B. The lens polarization layer 112 may be those commonly found in 3D glasses.

An output beam of light 106B from each pixel of LCD 103B may have a given polarization and composite intensity value. The polarizations of the respective polarization layers 112 associated with the viewing lens 110A and the viewing lens 110B may be such that, when a viewer's polarized glasses 102 filter the output beam of light 106B, the lens polarization layer 112 of the left viewing lens 110A transmits only the left channel of the stereoscopic image and the right lens polarization layer 112 of the right viewing lens 110A transmits only the right channel of the stereoscopic image, thereby enabling the viewer to see a complete stereo image. For example, the lens polarization layer 112A and the lens polarization layer 112B may be configured to have substantially orthogonal polarizations (e.g. as depicted in FIG. 1).

Referring to FIG. 3, each viewing lens 110 of the polarized glasses 102 may further include a birefringence compensation layer 113 (e.g. compensation layer 113A and compensation layer 113B). Birefringence may occur upon the decomposition of a ray of light into two rays (an ordinary ray and an extraordinary ray) when it passes through certain types of material, such as the LCD 103A and/or the LCD 103B. The compensation layer 113 may be a film layer applied to the viewing lens 110, the lens polarization layer 112A and/or lens polarization layer 112B which exhibits birefringent compensation characteristics to counter the birefringent effects of the LCD 103A and LCD 103B. The compensation layer 113A and the compensation layer 113B may have differing properties or compositions so as to be optimized for a particular users eyes (e.g. the compensation layer 113A and the compensation layer 113B may be configured so as to be optimized for a user's weaker eye).

The compensation layer 113 may be a uniaxial film with its optic axis parallel to the plane of the film (e.g. an A-plate) or perpendicular to the plane of the film (e.g. a C-plate). C-plates can be fabricated with uniaxially compressed polymers or casting cellulose acetate, while A-plates can be made by stretched polymer films such as polyvinyl alcohol or polycarbonate (See e.g. "Polymer negative birefringence films for compensation of twisted nematic devices", by Sergan et. Al. (*Displays*, vol. 20 (1999), pages 259-267)).

Alternately, viewing lens 110, the lens polarization layer 112A and/or lens polarization layer 112B may comprise the compensation layer 113. For example, the viewing lens 110, the lens polarization layer 112A and/or lens polarization layer 112B, themselves, may have a chemical composition or physical structure such that they exhibit birefringent compensation characteristics to counter the birefringent effects of the LCD 103A and LCD 103B in additional to any polarization characteristics (e.g. a blend of polymers exhibiting both birefringent compensation and polarizing characteristics may be used).

Further, a cooperating compensation layer 113 may be attached to a rear surface of the LCD 103B (not shown) should a particular compensation design dictate.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. An apparatus for viewing stereoscopic images comprising:
   a first passive viewing lens including a first polarization layer, the first polarization layer configured to permit light having a first polarization orientation to pass through the first polarization layer, the first passive viewing lens further including one or more first birefringence compensation layers, wherein the one or more first birefringence compensation layers are configured to compensate for decomposition of rays of light into ordinary rays and extraordinary rays as the rays of light pass through two or more liquid crystal display layers and a cooperating birefringence compensation layer of a stacked liquid crystal display, wherein a particular first birefringence compensation layer of the one or more first birefringence compensation layers is associated with the cooperating birefringence compensation layer of a particular liquid crystal display layer of the stacked liquid crystal display; and
   a second passive viewing lens including a second polarization layer, the second polarization layer configured to permit light having a second polarization orientation to pass through the second polarization layer, the second polarization orientation being different from the first polarization orientation, the second passive viewing lens further including one or more second birefringence compensation layers,
   wherein at least one of the one or more first birefringence compensation layers comprises at least one first uniaxial film having an optical axis parallel to the plane of the film, and
   wherein at least one of the one or more second birefringence compensation layers comprises at least one second uniaxial film having an optical axis perpendicular to the plane of the film.

2. The apparatus of claim 1, wherein the first polarization layer is configured to permit light having the first polarization orientation to pass through the first polarization layer, wherein the light having the first polarization orientation is associated with a first liquid crystal display (LCD) channel associated with a first stereoscopic image of a stereoscopic image pair, and wherein the second polarization layer is configured to permit light having the second polarization orientation to pass through the second polarization layer, wherein the light having the second polarization orientation is associated with a second LCD channel associated with a second stereoscopic image of the stereoscopic image pair.

3. The apparatus of claim 2, wherein the first LCD channel and the second LCD channel form a stereoscopic image.

4. The apparatus of claim 1, wherein the first polarization layer includes a birefringence compensation layer, and wherein the second polarization layer includes a birefringence compensation layer, wherein the birefringence compensation layer of the first polarization layer has different properties than the birefringence compensation layer of the second polarization layer.

5. The apparatus of claim 1, wherein the at least one first uniaxial film includes at least one of a polyvinyl alcohol film and a polycarbonate film.

6. The apparatus of claim 5, wherein the at least one second uniaxial film includes a cellulose acetate film.

7. Viewing glasses for viewing stereoscopic images comprising:
   a wearable frame;
   a first passive viewing lens alignable with a field of view of a first eye of a user, the first passive viewing lens including a first polarization layer, the first polarization layer configured to permit light having a first polarization orientation to pass through the first polarization layer, the first passive viewing lens further including one or more first birefringence compensation layers, wherein the one or more first birefringence compensation layers are configured to compensate for decomposition of rays of light into ordinary rays and extraordinary rays as the rays of light pass through two or more liquid crystal display layers and a cooperating birefringence compensation layer of a stacked liquid crystal display, wherein at least one of the one or more first birefringence compensation layers comprises a uniaxial film having an optical axis perpendicular to the plane of the film, and wherein a particular first birefringence compensation layer of the one or more first birefringence compensation layers is associated with the cooperating birefringence compensation layer of a particular liquid crystal display layer of the stacked liquid crystal display; and
   a second passive viewing lens alignable with a field of view of a second eye of the user, the second passive viewing lens including a second polarization layer, the second polarization layer configured to permit light having a second polarization orientation to pass through the second polarization layer, the second polarization orientation being different from the first polarization orientation, the second passive viewing lens further including one or more second birefringence compensation layers, wherein at least one of the one or more second birefringence compensation layers comprises a uniaxial film having an optical axis parallel to the plane of the film,
wherein the one or more first birefringence compensation layers have different properties than the one or more second birefringence compensation layers.

8. The viewing glasses of claim 7, wherein the first polarization layer is configured to permit light having the first polarization orientation to pass through the first polarization layer, wherein the light having the first polarization orientation is associated with a first liquid crystal display (LCD) channel associated with a first stereoscopic image of a stereoscopic image pair, wherein the first LCD channel is associated with a first liquid crystal display layer of the two or more liquid crystal display layers of the stacked liquid crystal display, and wherein the second polarization layer is configured to permit light having the second polarization orientation to pass through the second polarization layer, wherein the light having the second polarization orientation is associated with a second LCD channel associated with a second stereoscopic image of the stereoscopic image pair, wherein the second LCD channel is associated with a second liquid crystal display layer of the two or more liquid crystal display layers of the stacked liquid crystal display.

9. The viewing glasses of claim 8, wherein the first LCD channel and the second LCD channel form a stereoscopic image.

10. A system, comprising:
a stacked liquid crystal display, wherein the stacked liquid crystal display includes:
a light source;
a plurality of liquid crystal display layers, including:
a first polarization layer configured for imparting a first polarization orientation to light from the light source as the light passes through the first polarization layer; and
a second polarization layer configured for imparting a second polarization orientation to the light as the light passes through the second polarization layer,
wherein a cooperating birefringence compensation layer is deposited on one of the plurality of liquid crystal display layers;
a processor, the processor configured to receive image data associated with a left stereoscopic image channel and image data associated with a right stereoscopic image channel, the processor further configured to process the image data associated with the left stereoscopic image channel and the image data associated with the right stereoscopic image channel, the processor further configured to generate control signals for controlling each of the plurality of liquid crystal display layers such that when the light exits the plurality of liquid crystal display layers an intensity of the light is a vector sum of a vector quantity associated with an intensity of the left stereoscopic image channel and a vector quantity associated with an intensity of the right stereoscopic image channel; and
viewing glasses for viewing stereoscopic images, wherein the viewing glasses include:
a first passive viewing lens including a first polarization layer, the first polarization layer configured to permit light having the first polarization orientation to pass through the first polarization layer, the first viewing lens further including a first birefringence compensation layer, wherein the first birefringence compensation layer is configured to compensate for decomposition of rays of light into ordinary rays and extraordinary rays as the rays of light pass through the plurality of liquid crystal display layers of the stacked liquid crystal display, wherein the first birefringence compensation layer comprises at least one first uniaxial film having an optical axis parallel to the plane of the film, wherein the at least one first uniaxial film includes at least one of: a polyvinyl alcohol film; and a polycarbonate film; and
a second passive viewing lens including a second polarization layer, the second polarization layer configured to permit light having the second polarization orientation to pass through the second polarization layer, the second polarization orientation being different from the first polarization orientation, the second viewing lens further including a second birefringence compensation layer, wherein the second birefringence compensation layer comprises at least one second uniaxial film having an optical axis perpendicular to the plane of the film, wherein the at least one second uniaxial film includes a cellulose acetate film, wherein the first birefringence compensation layer has different properties than the second birefringence compensation layer,
wherein the first birefringence compensation layer is associated with the cooperating birefringence compensation layer of a particular liquid crystal display layer of the stacked liquid crystal display.

11. The system of claim 10, wherein an angle θ is computed as:

$$\theta = \cos^{-1}\left(\frac{I_{left}}{I_{total}}\right)^{\frac{1}{2}}$$

where $I_{left}$ is the vector quantity associated with intensity of the left stereoscopic image channel and $I_{total}$ is the composite sum of the vector quantity associated with intensity of the left stereoscopic image channel and the vector quantity associated with intensity of the right stereoscopic image channel.

* * * * *